Jan. 26, 1926.  1,570,842
M. I. KEVARI
WINDSHIELD CLEANER
Filed Feb. 26, 1923   2 Sheets-Sheet 1

Inventor
MATTI I. KEVARI
By
Attorney

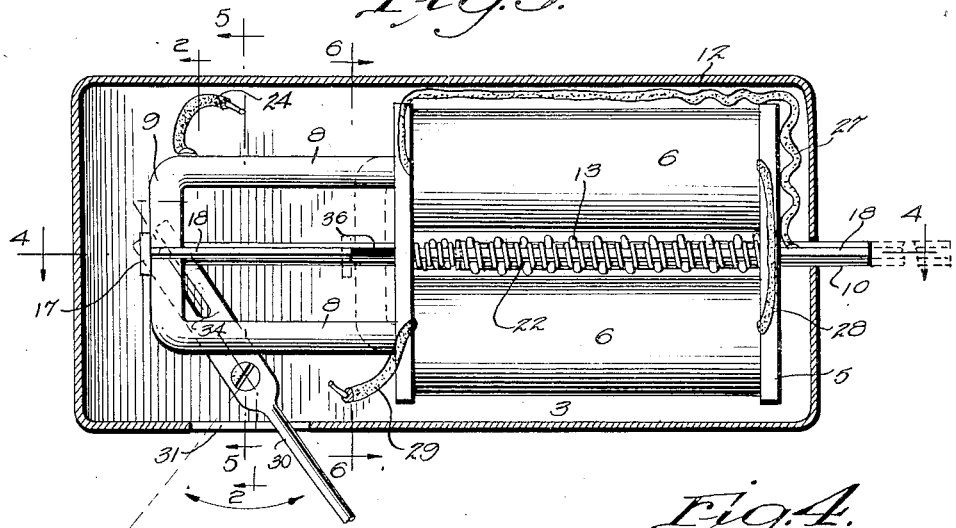
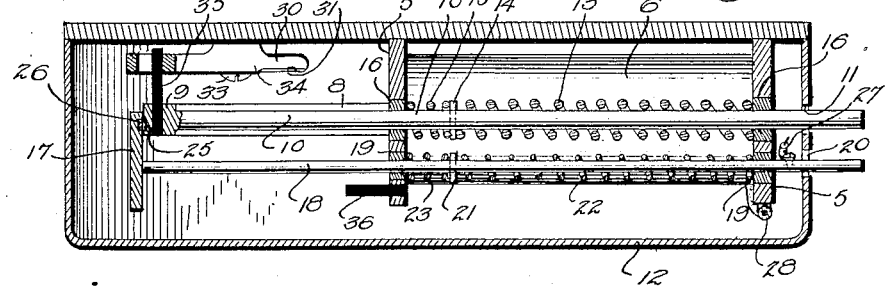
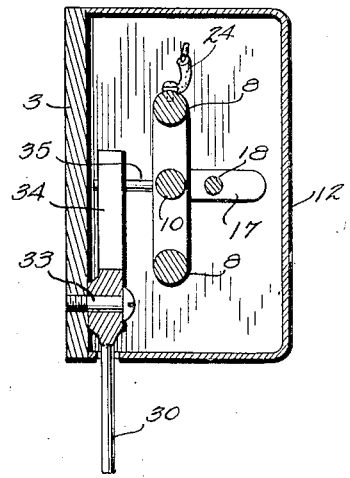
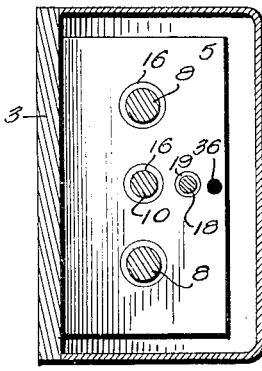

Patented Jan. 26, 1926.

1,570,842

UNITED STATES PATENT OFFICE.

MATTI I. KEVARI, OF BESSEMER, MICHIGAN.

WINDSHIELD CLEANER.

Application filed February 26, 1923. Serial No. 621,296.

*To all whom it may concern:*

Be it known that I, MATTI I. KEVARI, a citizen of the United States, residing at Bessemer, in the county of Gogebic and State of Michigan, have invented certain new and useful Improvements in Windshield Cleaners, of which the following is a specification.

This invention relates to windshield cleaners, and more particularly to electrically operated windshield cleaners.

An object of the invention is the provision of an electro-magnetic windshield cleaner having means for returning the mechanism to an initial position whereby a circuit is automatically closed and the core of the magnet actuated.

A further object is the provision of means for breaking the circuit when the core or armature reaches a position at one end of its movement.

A further object is the provision of actuating means including an auxiliary armature having a contact point to engage a contact on the main armature, to complete a circuit through the coils of the magnet.

Figure 1:
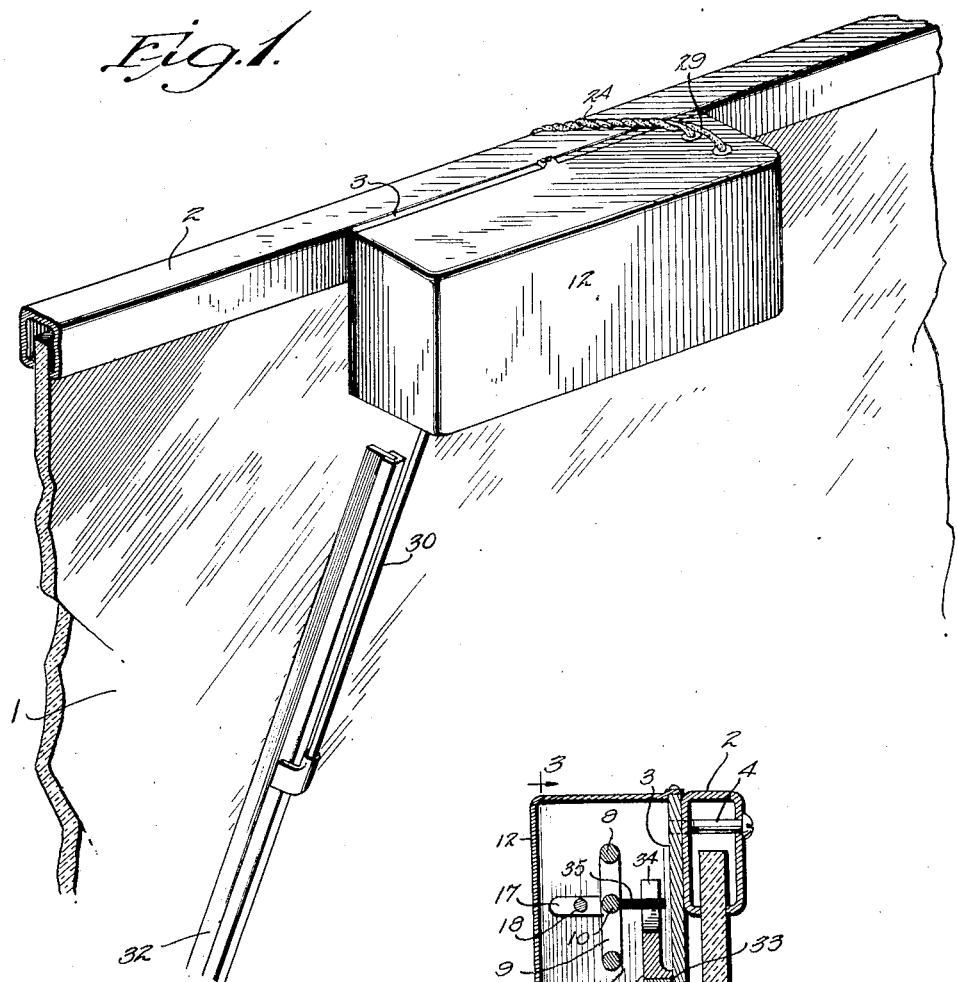
Figure 2:
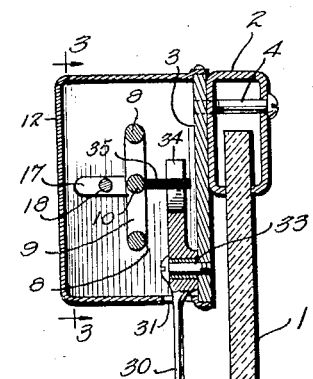

In the accompanying drawings, I have shown one embodiment of the invention. In this showing:

Figure 1 is a perspective view of a portion of a windshield showing the invention applied, Figure 2 is a vertical sectional view on line 2—2 of Figure 3, Figure 3 is a vertical sectional view on line 3—3 of Figure 2, Figure 4 is a horizontal sectional view on line 4—4 of Figure 3, Figure 5 is a transverse vertical sectional view on line 5—5 of Figure 3, and, Figure 6 is a similar view on line 6—6 of Figure 3.

Referring to the drawings, the reference numeral 1 designates generally the windshield of a motor vehicle, formed of glass or other suitable transparent material. This windshield is provided with the usual frame 2. The windshield cleaner forming the subject matter of the present invention consists of a base 3 which is adapted to be arranged on the side of the windshield to be cleaned. This base is secured to the windshield frame by screws 4 or similar fastening elements passing through openings in the windshield frame and received in threaded openings in the base.

A pair of end plates 5 are arranged on the base and these end plates are adapted to support electro-magnetic coils 6. A substantially U-shaped armature having arms 8 is arranged within the coils. The outer ends of the arms are connected by a base 9, as shown. A sliding arm or shaft 10 is arranged between the arms of the core or armature and connected thereto as shown. The free end of this arm projects through an opening 11 in a cover 12, which is secured to the base in any suitable manner. This member is provided with an expansion spring 13, adapted to normally hold it in the full line position shown in Figures 3 and 4. The spring is arranged between one of the end plates 5 and the pin 14, and is adapted to be compressed when the armature is attracted by the magnets and moved inwardly. A second spring 15 is arranged between the other end plate and the pin 14 and serves as a shock absorber when the arm is moved outwardly by the spring 13. As shown, the arm passes through fibre bushings 16 in the end plates.

An auxiliary armature 17 is mounted on a sliding bar 18 which also passes through the end plates 5. As shown, this bar is received in fibre bushings 19 to insulate it from the end plates. The end of this bar projects through an opening 20 in the casing or cover. This bar is also provided with a pin 21, arranged intermediate the end plates and an expansion spring 22 is arranged between the pin and one of the plates. A buffer spring 23 is arranged between the pin and the other plate.

The mechanism is connected to a suitable source of current such as a battery, by means of lead wires. As shown, a lead wire 24 is connected to the armature 8, adjacent its outer end. This armature is provided with a contact point 25, in alinement with a similar contact point 26, carried by the auxiliary armature 17. The sliding bar 18 is connected to one of the coils by means of a lead wire 27. The two coils are connected to each other by a wire 28 and the other coil is provided with a lead wire 29, leading to the other pole of the battery. A suitable switch (not shown) may be arranged in one of the lead wires to open and close the circuit when desired.

A cleaner arm 30 projects through a slot 31 in the bottom of the casing and carries a cleaner blade 32 which is adapted to contact with a portion of the windshield for cleaning purposes. As shown, the cleaner arm is pivoted on a pin 33 carried by the base. Beyond the pivot, the cleaner arm is provided with a fork 34. A pin 35 carried by the arm 10, projects into this fork.

A trip member 36 is arranged on the outside of the front end plate 5 and is adapted to engage the auxiliary armature 17 when it moves inwardly.

In operation, the parts are normally arranged in the position shown in Figures 3 and 4 of the drawings when the device is not in operation due to the springs 13 and 22. When the supply of current is cut off at any time, the springs move the armature and the bar 18 to their outer positions. The contacts 25 and 26 are in engagement with each other. If the circuit is now closed, current flows from its source through the wire 24 to the armature 8 through the armature to the contact 25 through the contact 26, auxiliary armature 17 to the bar 18. Thence it passes to the first coil through the wire 27 and, after passing through the coils, returns to the source of current through the wire 29. When the coils are energized, the armature is attracted and the auxiliary armature also moves inwardly due to the magnetic flux passing from the poles of the electro-magnets. This compresses the springs 22 and 13, and moves the cleaner arm through an arc of a circle. As the armatures approach their inner positions, the auxiliary armature 17 is engaged by the pin 36, separating the contacts 25 and 26 and thus breaking the circuit. The magnets are then deenergized and the spring 22 returns the auxiliary armature to its initial position. The main armature is likewise returned to its normal position by the spring 13. The strength of the two springs is proportionate to the parts to be moved by them so that the bar 18 and auxiliary armature will reach their initial position slightly before the main armature. The outward movement of these parts is cushioned by the springs 15 and 23, thus reducing unnecessary shock and vibration. With the auxiliary armature in its outer position, the outward movement of the main armature causes the contacts 25 and 26 to engage each other and again complete the circuit. The cycle of operation is repeated indefinitely as long as the circuit remains closed. The cleaner may be cut off when desired by opening the circuit and the parts will assume their initial position, with the contacts 25 and 26 in engagement with each other, and thus ready to operate whenever current is supplied.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. An electro-magnetic motor comprising a pair of coils, a substantially U-shaped armature adapted to be moved inwardly when the coils are energized, an auxiliary armature adapted to complete a circuit through said coils, when the U-shaped armature is in its outer position, means for breaking the circuit when the armature is in its inner position, and a spring to return said armature to its outer position when the circuit is broken.

2. An electro-magnetic motor comprising a pair of coils, a substantially U-shaped armature adapted to be moved inwardly by the energization of said coils, an auxiliary armature normally contacting with said U-shaped armature to maintain a circuit through said coils, a member arranged in the path of said auxiliary armature to disengage said auxiliary armature from said main armature and open said circuit, and means for returning said armatures to their outer positions when the circuit is opened.

In testimony whereof, I affix my signature.

MATTI I. KEVARI.